Figure 1:
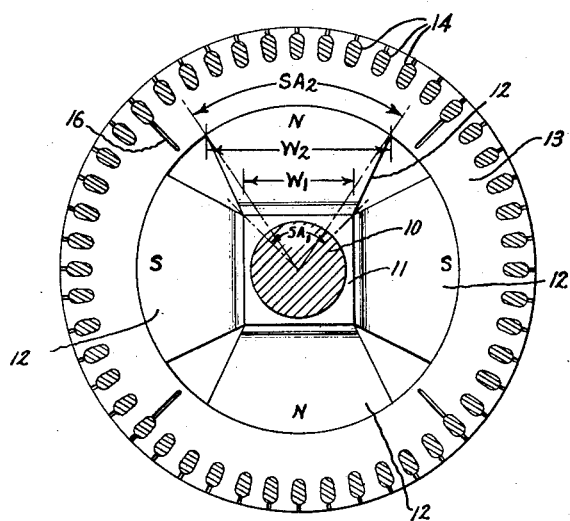

June 23, 1953  F. W. MERRILL  2,643,350

DYNAMOELECTRIC MACHINE MAGNETIC CORE MEMBER

Filed June 28, 1952

Inventor:
Frank W. Merrill,
by Richard E. Horley
His Attorney.

Patented June 23, 1953

2,643,350

UNITED STATES PATENT OFFICE 2,643,350

DYNAMOELECTRIC MACHINE MAGNETIC CORE MEMBER

Frank W. Merrill, Fort Wayne, Ind., assignor to General Electric Company, a corporation of New York Application June 28, 1952, Serial No. 296,162

2 Claims. (Cl. 310—156)

My invention relates to improvements in dynamoelectric machine magnetic core members and has particular significance in connection with permanent magnet excited rotors for synchronous induction motors and generators.

In the past, it has been known to provide, for synchronous induction machines, a rotor having a permanent magnet polarized radially to form polar areas on its outer surface, with a laminated sleeve member surrounding the permanent magnet and provided with a plurality of slots in its outer surface in which squirrel cage bars are positioned. The bars are short circuited by end rings, and if desired interpolar slots may be provided extending radially inward substantially through the laminated sleeve member intermediate the polar areas, all as more fully described in Patent 2,525,455—issued October 10, 1950, on an application filed by me and assigned to the assignee of the present invention. For some applications, one difficulty with the arrangement described in the patent, as well as with other prior art constructions utilizing a plurality of separate permanent magnet blocks, one or two for each pole, has been that there has been insufficient resistance to demagnetization. The operation of a dynamoelectric machine having a rotor constructed of one or more permanent magnets is somewhat different from the operation of a conventional electric current excited machine, since in the conventional machine the demagnetization or cross-magnetization of a magnetic member is accompanied by no permanent ill effects. On the other hand, demagnetization or cross-magnetization of a permanent magnet field can readily result in a shifting and weakening of the permanent magnet, thereby permanently impairing operation of the machine. It is for this reason that all prior art machines with which I am familiar present a problem in connection with resistance to demagnetization, dictating large size magnet blocks which impose limitations by requiring a large machine with a relatively low output rating without realizing the utmost savings in material costs and in the use of scarce and critical materials.

It is an object of the present invention to provide simple and inexpensive means for overcoming the above-mentioned difficulties.

A further object of the present invention is to provide an improved magnetic core construction permitting decreased material costs and decreased use of critical materials, and either permitting increased rating or, alternatively, decreased sizes for the same ratings.

A still further object of the present invention is to provide an improved permanent magnet type dynamoelectric machine rotor characterized by low cost per unit of resistance to demagnetization, thereby to permit increased ratings in the same size frames or decreased frame sizes for the same ratings.

In accordance with one aspect of the present invention, I provide relatively great resistance to demagnetization, such as to the demagnetization caused by an A.-C. revolving field, by providing a rotor assembly which comprises a steel shaft having a square center portion on which there is mounted a plurality of blocks of Alnico or other permanent magnet material, with each of the blocks flaring circumferentially outwardly radially outward in axial cross section, and at the same time flaring axially inwardly radially outward in longitudinal cross section, so that with the circumferential outward flaring there will be no decrease of subtended angle of magnet and, with the axial inward flaring, a relatively constant tangential cross section is preserved thereby to utilize a minimum amount of expensive and critical material with respect to securing maximum utilization thereof.

Figure 2:
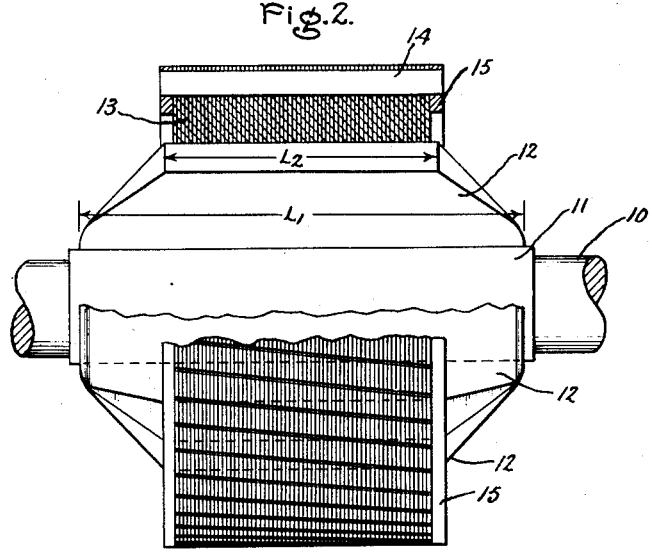

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which:

Fig. 1 is an end view of a dynamoelectric machine permanent magnet type rotor core member constructed in accordance with my invention, and Fig. 2 is a side elevational view, partly in section, of the rotor of Fig. 1.

Referring now to Figs. 1 and 2, there is shown a shaft 10 provided with a square faced central portion 11 of magnetic material such as steel, on the flat surfaces of which are located one to each face in the illustrated embodiment, a plurality of blocks 12 of permanent magnet material, such as of one of the aluminum-nickel-cobalt-iron alloys commonly known as Alnico. It is presumed that the permanent magnet blocks have been, or will be, polarized radially to provide four poles, as indicated by the legends N and S on Fig. 1, and that the blocks are secured against the shaft flat faces in any convenient manner. Separate fastening means are not shown in the illustrated embodiment and it is assumed that press fits are used to hold the pole piece blocks which are surrounded by a laminated sleeve member 13 of soft iron or steel and made up of relatively thin laminations which are provided with winding slots. In finished form these slots contain squirrel cage bars 14 short-circuited by end rings 15 (Fig. 2) to provide an induction motor secondary winding also acting as a damping winding to shield the magnets from de-magnetizing A. C. fluxes. The laminated sleeve 13 is shown provided with interpolar slots 16 furnished as described in my above-mentioned Patent 2,525,455 in order that there will be little tendency for the permanent magnet flux to be short-circuited through the sleeve member.

The arc of each magnet pole radially outer face may preferably be made to subtend two-thirds of the pole pitch on the inside surface of the laminated sleeve member 13, in which case the cross section of the pole, as viewed axially in Fig. 1, may be found to decrease as the central shaft is approached radially inwardly, and this would mean that if the axial length were to be maintained constant, there would not be a uniform magnet M. M. F. with travel of the flux radially outwardly or inwardly across the pole piece. On the other hand, the radially outwardly flaring cross section shown in Fig. 1 will be found advantageous since I have found that conventional straight-sided magnet blocks are quantitatively incorrect due to their great decrease in magnet area, because of decrease of subtended angle, of magnet adjacent the soft iron ring. The best present-day magnets are made of materials, particularly cobalt, which are becoming increasingly critical and difficult to obtain, and it is therefore increasingly important to effect whatever savings are possible in the use of such materials. I have found that if the areas of the cast magnet blocks are equalized inside and out, maximum ratings can be achieved with the minimum use of such materials, and it will be observed from Fig. 2 that the inner length $L_1$ of each block is substantially greater than the outer length $L_2$ to compensate for the fact that the inner width $W_1$ is substantially less than the outer width $W_2$. That is to say, that even if the radially outward flare of Fig. 1 is such that the inner subtended angle $SA_1$ is greater than the outer subtended angle $SA_2$, flux density is a function not only of subtended angle but also of actual width times actual length. The actual inner width $W_1$ is less than the outer width $W_2$, and therefore there is an axially inward flare in the longitudinal direction as indicated in Fig. 2, so that the inner length $L_1$ is greater than the outer length $L_2$, and desirably the product of inner width and length $W_1 \times L_1$ closely approaches or equals the product of $W_2 \times L_2$. There is thus provided means for achieving a uniform magnet M. M. F. per unit of radial length and, at the same time, preserving critical, scarce and costly materials by utilizing each increment of magnet volume at a uniform flux density allowing the largest possible ratings to be obtained from any given frame size. There also occurs an additional advantage because there will be a saving in both iron and copper, both in the stator and in the rotor, because the converging axial limits of the permanent magnet blocks dictate shorter stacking and shorter conductors for both rotor and stator cores.

With the arrangement of the invention in which the product of the shorter length of the outer portion of each bar magnet times its width at that point equals or approximates the product of the longer length times the narrower width at the base of the magnet, the blocks may operate to oppose the demagnetization of flux coming from the stator core portion (not shown) to a much greater degree than would the same permanent magnet material weight in the usual form.

There is thus provided a device of the character described, capable of meeting the objects hereinabove set forth. While I have illustrated and described a particular embodiment of this invention, various modifications will obviously occur to those skilled in the art. I desired it to be understood, therefore, that my invention is not to be limited to the particular arrangement disclosed, and I intend in the appended claims to cover all modifications which do not depart from the true spirit and scope of my invention.

What I claim as new and desire to secure by Letters Patent of the United States is:

1. A dynamoelectric machine rotor comprising a shaft having a central portion provided with flat faces around the periphery thereof, a plurality of permanent magnet material blocks secured one on each of said flat faces, a laminated sleeve of magnetic material surrounding the periphery of the assembly of said blocks on said shaft, the width of each of said blocks in axial cross section being substantially greater adjacent said sleeve than the width thereof adjacent said shaft portion, and the length of each of said blocks in axial elevation being substantially greater adjacent said shaft portion than the length thereof adjacent said sleeve.

2. For use in a dynamoelectric machine having a longitudinally extending axis, a magnetic core member adapted to pass flux radially with respect to said axis, said core member having a radially inner face and a radially outer face, and radially outwardly flaring sides extending between said faces such that the subtended angle of said sides at said inner face with respect to said machine axis is greater than the subtended angle of said sides at said outer face, while the straight-line width between said sides at said inner face is less than the straight-line width between said sides at said outer face, and said core member having radially inwardly flaring ends such that the length between said ends at said inner face is greater than the length between said ends at said outer face to preserve uniform magnetomotive force distribution throughout said member.

FRANK W. MERRILL.

No references cited.